2 Sheets--Sheet 1.

G. W. BROWN.

Seed-Planter.

No. 6,384.

Reissued April 20, 1875.

Witnesses:

A. McCallum

D. B. Stuart

Inventor:

Geo. W. Brown,

By W. B. Richards

Atty.

2 Sheets--Sheet 2.

G. W. BROWN.
Seed-Planter.

No. 6,384.

Reissued April 20, 1875.

Witnesses:

A. McCallum

D. G. Stuart

Inventor:

Geo. W. Brown,

By W. B. Richards,

Atty.

UNITED STATES PATENT OFFICE.

GEORGE W. BROWN, OF GALESBURG, ILLINOIS.

IMPROVEMENT IN SEED-PLANTERS.

Specification forming part of Letters Patent No. 46,615, dated February 28, 1865; reissue No. 6,384, dated April 20, 1875; application filed January 6, 1875.

DIVISION A[1].

*To all whom it may concern:*

Be it known that I, GEORGE W. BROWN, of Galesburg, county of Knox and State of Illinois, have invented certain Improvements in Seed-Planters; and I do hereby declare that the following is a full, clear, and exact description of the construction and operation of the same, reference being had to the annexed drawings, making a part of this specification, and to the letters and figures of reference marked thereon.

Figure 1:
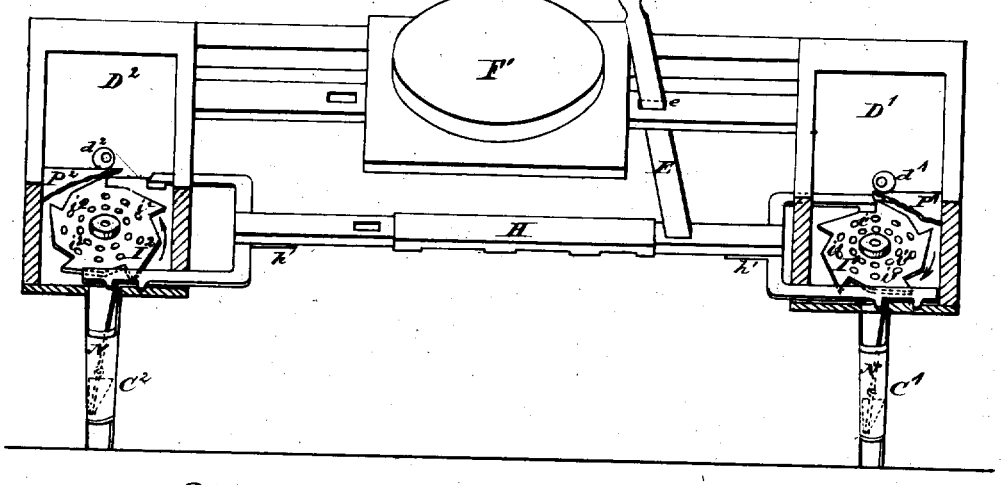
Figure 5:
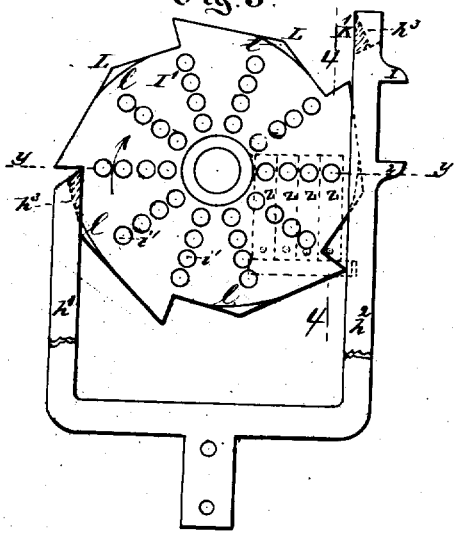
Figure 4:
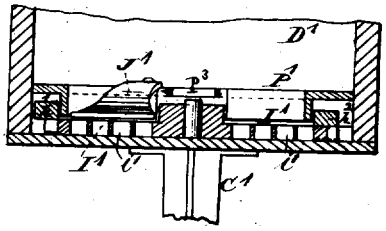
Figure 6:
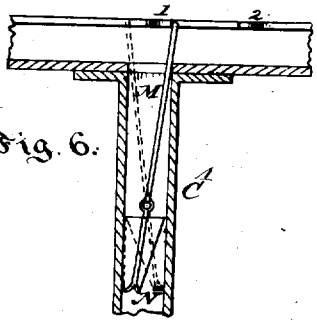
Figure 7:
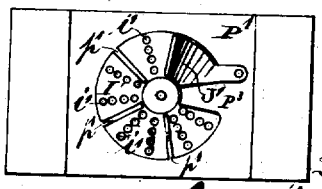
Figure 2:
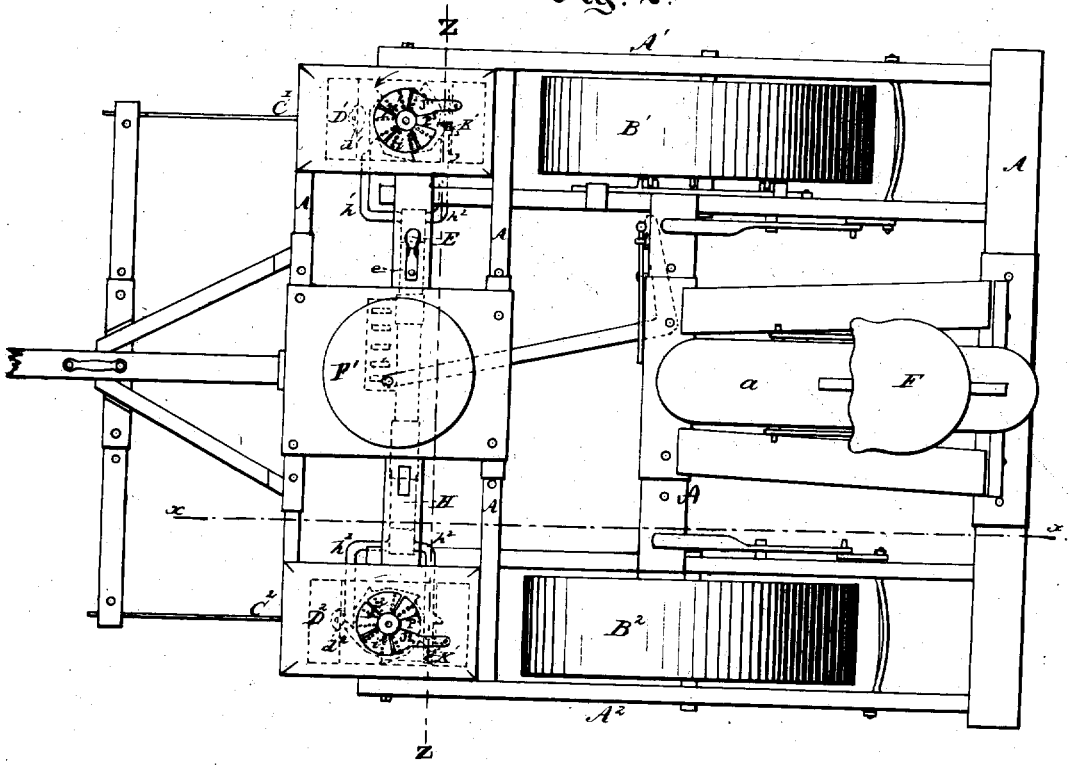
Figure 3:
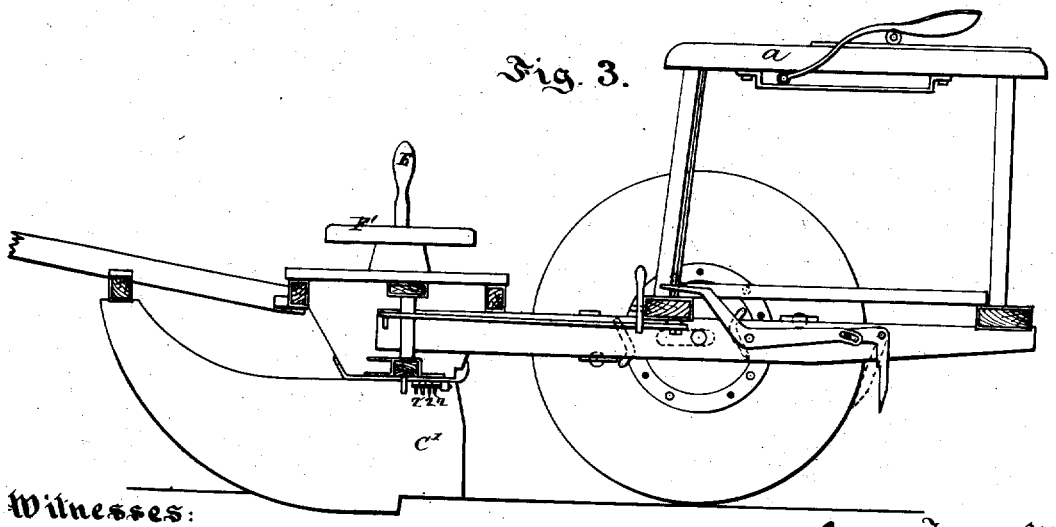

Figure 1 is a sectional view on the line *z z* in Fig. 2, and in perspective, and showing the caps of the seed-wheels removed. Fig. 2 is a top-plan view of a machine embodying my invention. Fig. 3 is a vertical sectional view on the line *x x* in Fig. 2. Fig. 4 is a sectional view through the base of the right-hand seed-hopper, on the plane of the line *y y* in Fig. 5. Fig. 5 is a top-plan view of the seed-cup plate and propelling mechanism. Fig. 6 is a vertical sectional view on the line 4 4 in Fig. 5. Fig. 7 is a top-plan view of the interior of the seed-hopper.

In the seed-planting machine operated by hand for check-row planting in hills it is very desirable to secure uniformity in the quantity of the seed-charges, and for this purpose I use a horizontally-rotating wheel in the seed-hopper, provided with orbital series of seed-cups, each of which is insured uniform and regular filling with seed by the number of percussive blows received by said wheel, for the purpose of starting and stopping it, from the reciprocating movements of the hand-lever. The seed-wheel is given a progressive intermittent rotary motion by means of a reciprocating lever in the hand of an operator, each forward motion of the lever rotating the wheel partially, and bringing one radial series of seed-cups in conjunction with the throat of the seed-tube, while the same movement carries the series of seed-cups last in said conjunction beyond the throat. Each return movement of the lever produces the same movement and results of the seed-wheel as the forward movements thereof. The valve in the lower end of the seed-tube also receives an impulse from each forward and also from each return movement of the lever, and receives one and discharges another quantity of seed, measured by the seed-wheel at each of its movements; and thus each impulse of the hand-lever drops a charge of seed from the seed-wheel, and discharges one and receives another charge by the lower valve in the seed-tube, while the seed-cups receive as many percussions or starts and stops as they are in number, in orbital series, to insure their uniform filling with seed.

To enable others skilled in the art to make and use my invention, I will now proceed to describe the same with reference to the drawings.

$A^1$ is the right side and $A^2$ the corresponding left-hand half of the framing, and A A are intermediate portions of the framing which connect these parts. The peculiarity of the construction in connection with the parts A $A^1$ $A^2$ need not be described here, further than a reference to the drawings. The forward portion of the framing, which carries the runners and seed-hoppers, is connected to the main portion of the framing by a joint in the manner described in my patent of May 8, 1855. The bolt which forms the axis extends through the seed-boxes, as indicated. $B^1$ $B^2$ are the cylindrial drums or supporting-wheels. $C^1$ $C^2$ are the seed-tubes in the runners, and $D^1$ $D^2$ are the seed-hoppers. E is a lever, adapted to be operated by hand, to communicate the proper motion to the planting mechanism when planting in check-rows. All these parts are similar in their general construction and operation to corresponding parts described in the patent before referred to. F is the driver's seat, supported on elevated ways *a*, and F′ the seat for the operator of the dropping mechanism.

The drawings show the transverse bars of the framing as adjustable in length, as also the transverse reciprocating bar H, to adapt the machine to planting at different distances between the rows. The transverse reciprocating bar H has its central part, at each end, removed, so as to form limbs $h^1$ $h^2$ at each end, the form of which is indicated in Figs. 1, 2, 4, and 5. The seed is measured off and transferred from the seed-hoppers into the seed-tubes by means of horizontal wheels $I^1$ $I^2$, which are shaped as represented, and are adapted to receive the seed in perforations or seed-cups $i^1$ $i^2$, and by the rotation of these wheels to carry the contents of the cups under suitable cut-offs, $J^1$ $J^2$, to deliver to the seed-tubes. These wheels $I^1$ $I^2$ are operated by a positive motion just far enough to bring, consecutively, each radial series of seed-cups over the throat to the seed-tube, and no farther, at each movement of the hand-lever E in either direction. The lever E, being pulled by the operator, turns on its fulcrum *e*, and carries the reciprocating bar H to the right. This movement gives a partial rotation to both wheels $I^1$ $I^2$. It effects this by thrusting the forward limb $h^1$ against one of the teeth of the wheel $I^1$, and by pulling the hook or shoulder on the rear arm of the fork $h^2$ against one of the teeth of the wheel $I^2$. The return movement of the hand-lever moves the bar H in the opposite direction, and gives an equal further motion to both the seed-wheels $I^1$ $I^2$ by the thrusting of the forward arm of the fork $h^1$ against a tooth of the wheel $I^2$, and by the drawing action of the rearward arm of the fork $h^2$, which is provided with a shoulder or hook, $K^1$, corresponding to the before-described hook. The wheels $I^1$ $I^2$ are by these operations turned equally at each movement of the lever E.

When the movement of the lever H in either direction is effected rapidly, the momentum of the wheels $I^1$ $I^2$ tends to continue their motion and throw them too far around, and cause the wheels to come to rest in a false position. I avoid this evil by causing certain obtuse angles or slight projections on the wheels $I^1$ $I^2$ to strike at the proper time and rest fairly against the inner faces of the forks $h^1$ $h^2$.

The Figures 1 and 5 indicate the exact forms of these parts.

The upper half of the thickness of the wheels $I^1$ $I^2$ is differently formed at the periphery from the corresponding part of the lower half, and performs a different function. The lower half presents angles in this part, which are designated L. The corresponding points on the upper half are rounded, and are distinguished by the letter *l*. The forms of the inner faces of the limbs $h^1$ $h^2$ are as follows: At the points on the inner surfaces of the limbs $h^1$ $h^2$ which, at the end of each of the sudden movements, lie opposite to the slight projections or obtuse angles L, the fork has a perpendicular face, extending its full depth; but when the succeeding or return movement of the bar H has progressed a little way, a recess, $h^3$, which is formed, as represented, on each inner face of the forks $h^1$ $h^2$, is presented to the corresponding angle L, and the angle enters it, thus allowing the wheel to turn freely again in obedience to the impulse which it then commences to receive from the other arm of the fork, and thus the operation proceeds with certainty and precision.

$P^1$ $P^2$ are caps for the seed-cup wheels $I^1$ $I^2$. The opening therein, to present the seed to the seed-wheels, extends around nearly the entire working surfaces of the latter. There is a broad projection, $P^3$, extending over that part of the wheel where the seed is delivered to the seed-tubes, and $p^1$ $p^2$ are slender arms or agitators cast upon the caps, and standing in the positions represented. Each entire cap, with the several projections referred to, and the attached cut-off $J^1$ or $J^2$, is removable on turning the corresponding wedge-shaped button $d^1$ or $d^2$, and raising the cap on that side, so as to draw it out in the obvious manner.

The office of my cut-offs $J^1$ $J^2$ is to separate the seed in the seed-cups from their companions as the revolution of the seed-wheels presents them thereto. I employ elastic plates of metal for the purpose. There are four seed-cups which are to be thus treated at the same time in each seed-wheel, and I provide a corresponding elastic cut-off, arranged as represented by $J^1$ $J^2$, to cover the four cups. The seed-tubes $C^1$ $C^2$ are formed in the widened rear ends of the runners. M is a fixed partition therein for separating the seed, and the vibrating valve or flipper N is correspondingly divided to adapt itself thereto. The upper extremities of the valves N are urged in opposite directions by the projections 1 and 2 on the rear arm of the corresponding forked part of the bar H at each half movement or change of position of the bar H from one extreme position to the other, and performs the same duties as in my former patent above referred to. Z Z are slides, which may be readily adjusted by the attendant. They are adapted each to cover the bottom of its respective seed-cup, and to prevent the dropping of any seed from the seed-cup closed thereby, and thus may be utilized to close one, two, or three of the four seed-cups, which constitute one of the radial series, which may drop their contents simultaneously when the slides Z are all removed therefrom. It will be obvious that by thickening the wheels $I^1$ $I^2$ the seed-cups may be deepened, and a slight enlargement of their diameter in addition thereto will enable them to hold each sufficient seed for a hill, and the balance of the radial series to be dispensed with. For planting very small seeds, however, the radial series of small cups will be found very efficient. The drawing represents all of the slides Z pushed in. The drawing also represents devices for operating the dropping mechanism automatically; but this I consider unimportant, as experience has proved that operating the droppers by an attendant is the only successful way of check-row planting. It will be seen that the seed-wheels worked by hand and performing complete revolutions by increments enable me to plant in check-rows by the same movements of the lever E as in my patent of 1855, and realize the same advantage therefrom; and that each seed-cup is started and stopped as many times as there are series of cups in the circle before it is brought beneath the cut-offs. In the drawing ten series are shown; consequently each seed-cup is started and stopped, with a slightly percussive action, ten times before it discharges, and thus its filling regularly and surely is secured. And, further, by reason of my seed-dropping wheels, and the forks on the seed-bar, arranged to operate together as described, I am enabled to give the desired progressive motion to the rotating wheels with very simple movements, and movements to which farmers have become accustomed by the use of other machines, so that very little practice is required to operate my machine successfully.

What I claim as new, and desire to secure by Letters Patent, is—

1. The combination, in a seed-planting machine, of the horizontal rotating wheels $I^1$ $I^2$, transverse reciprocating bar H, and operating hand-lever E, so that by the reciprocating movement of the hand-lever and transverse bar an intermittent rotary motion will be imparted to the seed-wheels, substantially as and for the purpose specified.

2. The fork $h^1$ $h^2$, arranged to operate with the toothed seed-wheels $I^1$ $I^2$, so that the forward movement of the fork will give impulse to the wheel and turn it to a certain extent in one direction, and the return movement of said fork will give a similar impulse to said wheel, and in the same direction as received from the forward motion of the fork, thus turning the wheel intermittently, and always in the same direction, substantially as described, and for the purpose specified.

3. The combination, in a seed-planting machine, of a horizontally-rotating seed-wheel in the hopper, and valve in the seed-tube, transverse reciprocating bar, and operating hand-lever, all substantially as and for the purpose specified.

GEORGE W. BROWN.

Witnesses:
M. D. HEBBERD,
J. J. TUNNICLIFF.